United States Patent
Cowan

(10) Patent No.: US 6,645,592 B1
(45) Date of Patent: Nov. 11, 2003

(54) LAMINATED LINER SYSTEM

(76) Inventor: Randy G. Cowan, 600 E. 52nd St. North, Sioux Falls, SD (US) 57104

( * ) Notice: Subject to any disclaimer, the term of this patent is extended or adjusted under 35 U.S.C. 154(b) by 0 days.

(21) Appl. No.: 09/931,682

(22) Filed: Aug. 16, 2001

(51) Int. Cl.[7] .................................................. B32B 9/06
(52) U.S. Cl. .................... 428/41.8; 428/40.1; 428/41.7; 428/192; 428/194; 428/57; 428/58; 428/60; 428/77; 428/78; 428/212; 428/220
(58) Field of Search ............................... 428/40.1, 41.7, 428/41.8, 192, 194, 77, 78, 57, 58, 60, 212, 220

(56) References Cited

U.S. PATENT DOCUMENTS

| | | | | |
|---|---|---|---|---|
| 3,971,866 A | * | 7/1976 | Johnson | 428/41.4 |
| 4,609,589 A | * | 9/1986 | Hosoda et al. | 428/352 |
| 5,154,956 A | * | 10/1992 | Fradrich | 428/40.6 |
| 5,736,212 A | * | 4/1998 | Fischer | 428/42.2 |
| 6,210,767 B1 | * | 4/2001 | Knauf | 428/40.1 |

* cited by examiner

Primary Examiner—Harold Pyon
Assistant Examiner—Walter B Aughenbaugh

(57) ABSTRACT

A laminated liner system of the invention includes a base layer with a front face for adhering a plurality of labels thereon and a back face opposite the front face. A reinforcing layer has a front face positioned adjacent to the back face of the base layer. Optionally, the reinforcing layer may extend to the lateral side edges of the base layer or may be spaced from the side edges of the base layer. An adhesive adheres the front face of the reinforcing layer to the back face of the base layer. The invention also includes a method of applying the reinforcing layer to the base layer, and an apparatus for applying the reinforcing layer to the base layer.

10 Claims, 6 Drawing Sheets

LAMINATED LINER SYSTEM

BACKGROUND OF THE INVENTION

1. Field of the Invention

The present invention relates to label liner materials and more particularly pertains to a new laminated liner system for providing a liner having the economy of paper liner materials and the strength of plastic film liner materials.

2. Description of the Prior Art

Label carrier liners are employed to carry labels that employ an adhesive, such as a pressure sensitive adhesive, on a back surface of the label structure. The carrier liner is typically coated on a front surface with a substance, such as silicone, to enhance release of the pressure sensitive adhesive from the liner prior to final application of the label to a surface. Typically, labels are manufactured at a location remote from the location at which the labels are finally applied to an end product, and the carrier liner protects the adhesive from degradation between the time of manufacture of the label and the time of application. Additionally, the carrier liner typically serves additional functions, such as carrying or supporting various components of the label structure during the label manufacturing process, and also feeding the attached labels into automated label application machinery that removes the label from the carrier liner to the surface of the end use of the label.

The use of various carrier liner materials is known in the prior art. While various materials have been employed, there are primarily two options for liner materials—namely paper—and plastic film-based materials. The type of liner material used is often based upon its suitability for the process employed to apply the label to the surface of the end use, such as, for example, a container or other product structure. Typically, thinner (and generally weaker) materials may be used when the label is manually peeled from the liner and applied to the container, while thicker (and generally stronger) materials may need to be used when the labels are to be peeled from the liner by the automated application machinery.

Paper liner materials tend to have the most economical cost, and are especially suitable for use when the labels are applied by hand, but are less suitable for use with automatic label application machines because of the tendency of the paper liner to tear, especially if an edge of the liner has a preexisting nick or small tear. The automated application machinery often passes the relatively more flexible carrier liner over or about a sharp edge or corner so that the relatively stiffer labels adhered to the liner are induced to peel away from the liner as the liner bends about the corner. Weaker liner materials such as paper have a tendency to tear at the corner, which requires the application machinery to be stopped, the liner to be rethreaded on the machinery, and the machinery restarted. This problem can be especially pronounced when the labels are relatively larger, and impose greater stresses on the liner at the corner.

Plastic film liner material is significantly more resistant to tearing on automatic application machinery, especially at thicknesses as thick as 1.5 mils or greater, and is thus more suitable for use on the automated application machinery. However, the plastic film liner is significantly more expensive (at costs of up to two times greater or more) than liners formed of paper, so that the use of conventional plastic film liner material is generally avoided unless the strength of the plastic film liner is required to avoid tearing or other problems on automated label application machinery.

The laminated liner system according to the present invention substantially departs from the conventional concepts and designs of the prior art, and in so doing provides an apparatus primarily developed for the purpose of providing a liner having the economy of paper liner materials and the strength of plastic film liner materials.

SUMMARY OF THE INVENTION

In view of the foregoing disadvantages inherent in the known types of label liner materials now present in the prior art, the present invention provides a new laminated liner system construction wherein the same can be utilized for providing a liner having the economy of paper liner materials and the strength of plastic film liner materials.

To attain this, the present invention generally comprises a base layer with a front face for adhering a plurality of labels thereon and a back face opposite the front face. A reinforcing layer has a front face positioned adjacent to the back face of the base layer. An adhesive adheres the front face of the reinforcing layer to the back face of the base layer. The invention also includes a method of applying the reinforcing layer to the base layer, and an apparatus for applying the reinforcing layer to the base layer.

While it may seem contra intuitive to conventional thinking in the subject matter technology to employ two layers of material laminated together as a more cost effective alternative to merely employing a single layer alone, the combination of a base layer (formed, for example, of paper) and a reinforcing layer (formed, for example, of a plastic film) permits a suitably strong carrier liner structure to be formed from a relatively thinner thickness of a relatively more expensive material (such as the plastic film) that could be suitably used by itself to carry labels.

Moreover, the ability to use thinner plastic film materials reduces the cost of the plastic film material by such a significant degree that the combined cost of the paper material and the thinner plastic film material is still significantly less than the cost of plastic film material in thicknesses typically used when the plastic film material is used alone as a carrier liner.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the objects of the invention will become apparent when consideration is given to the following detailed description thereof. Such description makes reference to the annexed drawings wherein.

DESCRIPTION OF THE PREFERRED EMBODIMENT

Figure 1:
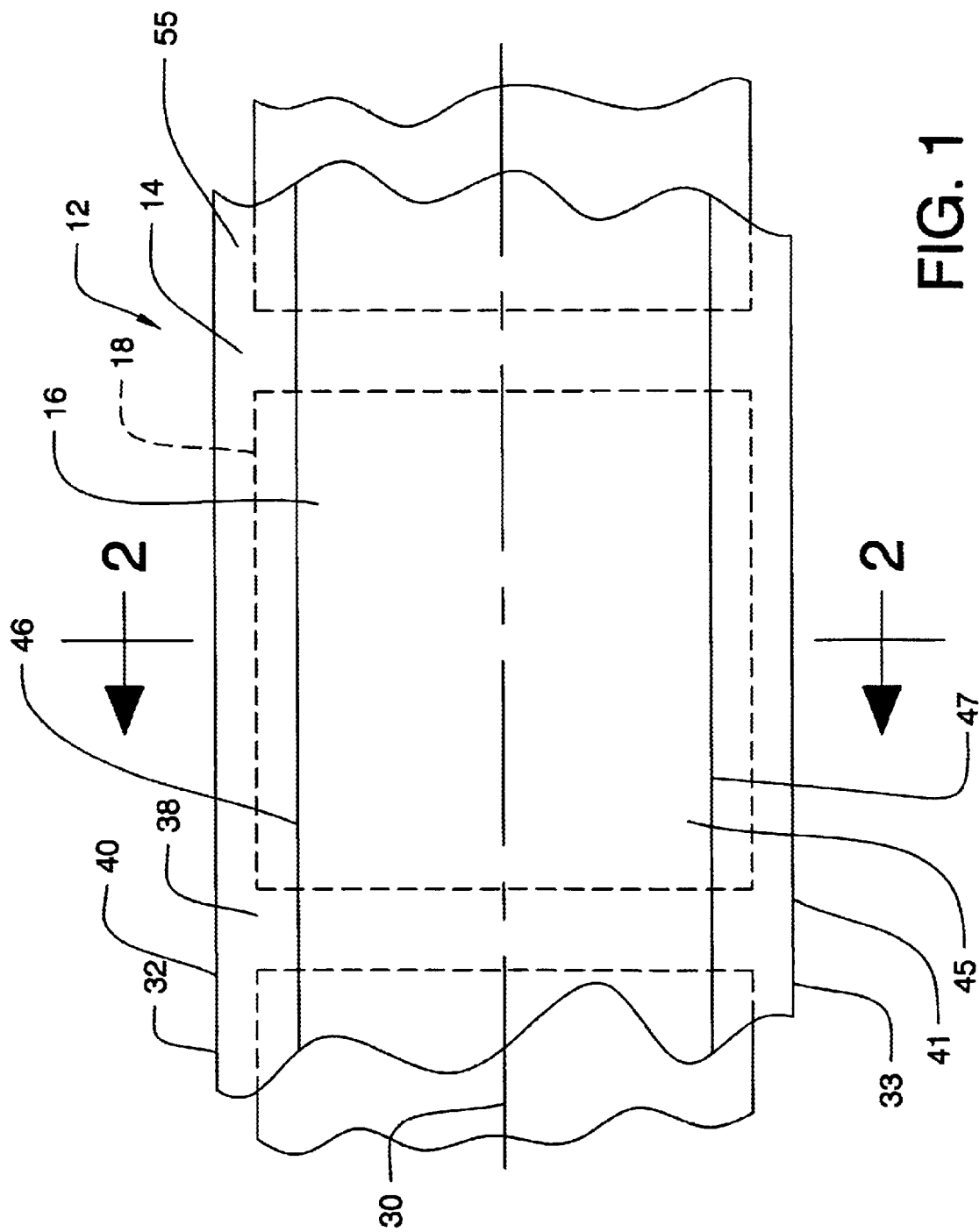
FIG. 1 is a schematic rear view of a new laminated liner according to the present invention.
Figure 2:
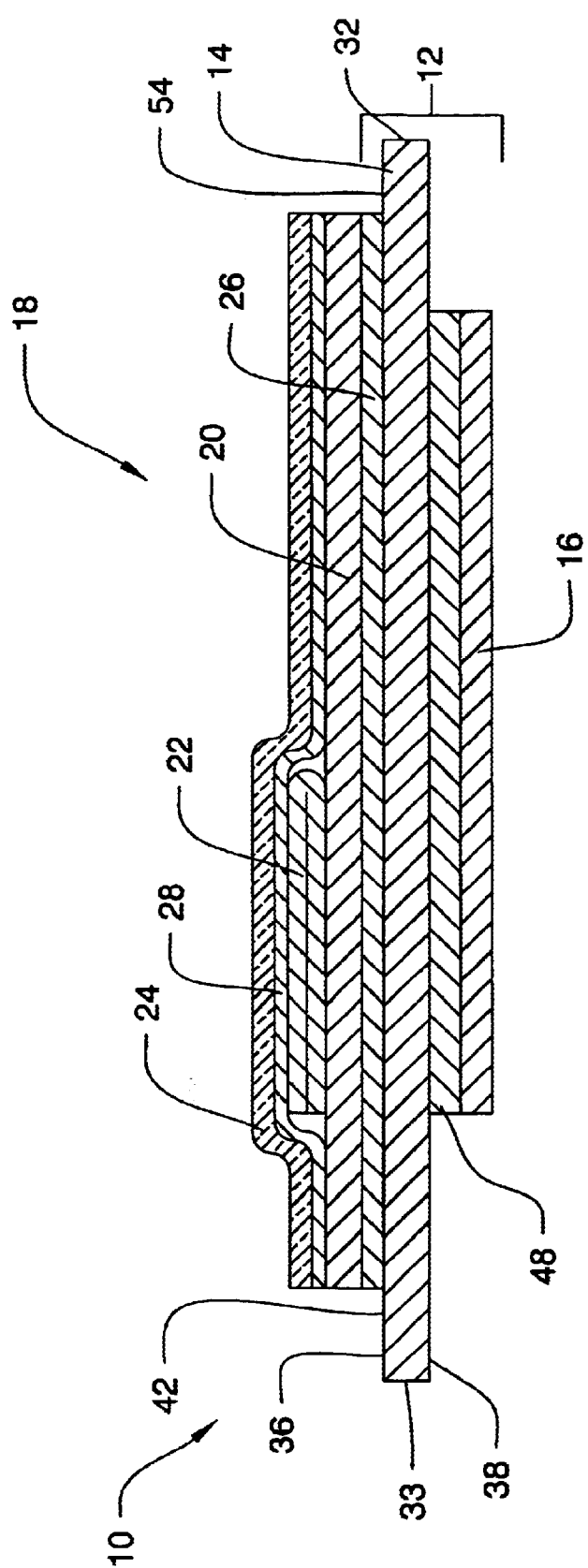
FIG. 2 is a schematic sectional view of the laminated liner of the present invention taken along line 2—2 of FIG. 1 and showing an exemplary label structure adhered thereon.
Figure 3:
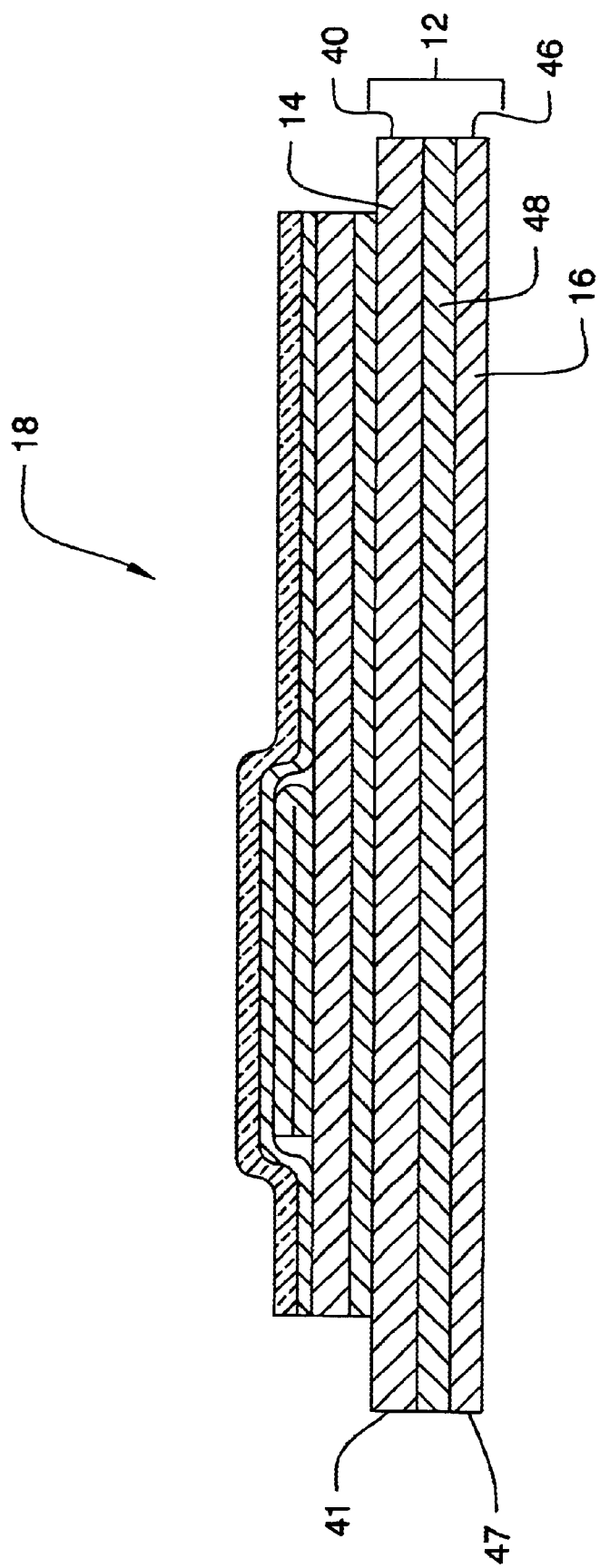
FIG. 3 is a schematic sectional view of the present invention showing an optional relationship of the reinforcing layer to the base layer of the liner structure.
Figure 4:
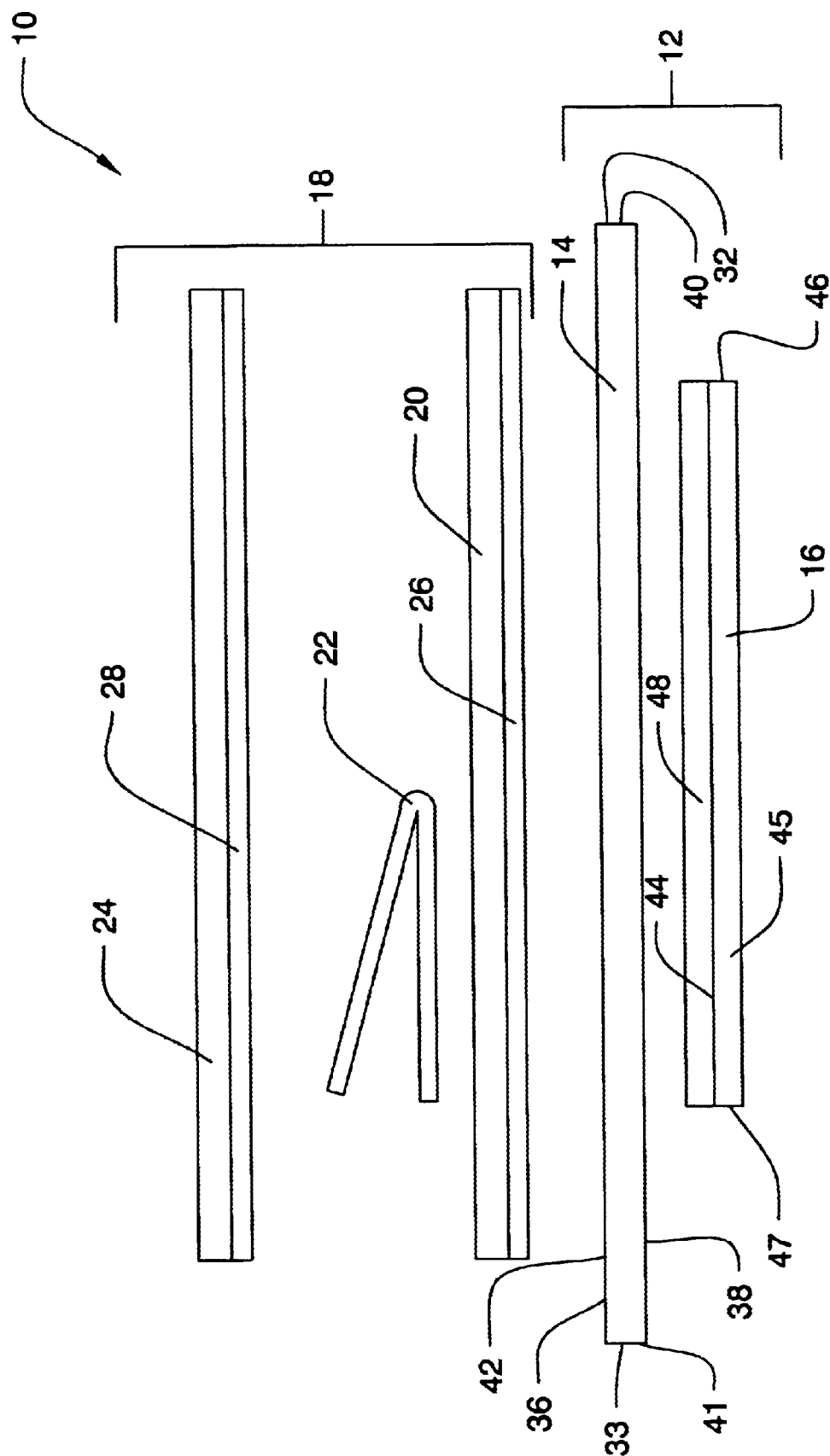
FIG. 4 is a schematic exploded view of the laminated liner present invention and the exemplary label structure.
Figure 5:
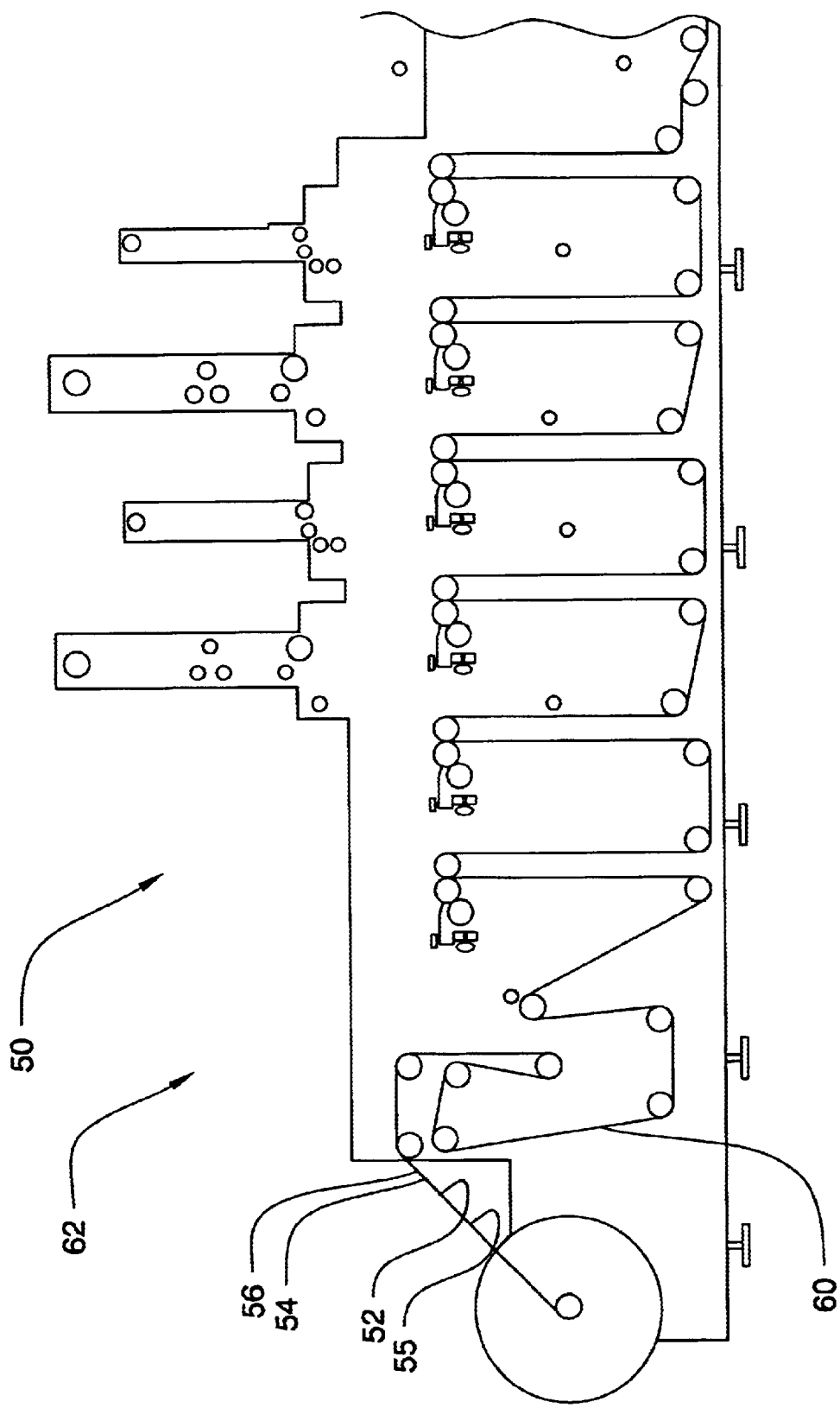
FIG. 5 is a schematic side view of a first portion of a label structure forming apparatus particularly showing the path of the base layer of the laminated liner along the label structure forming apparatus.
Figure 6:
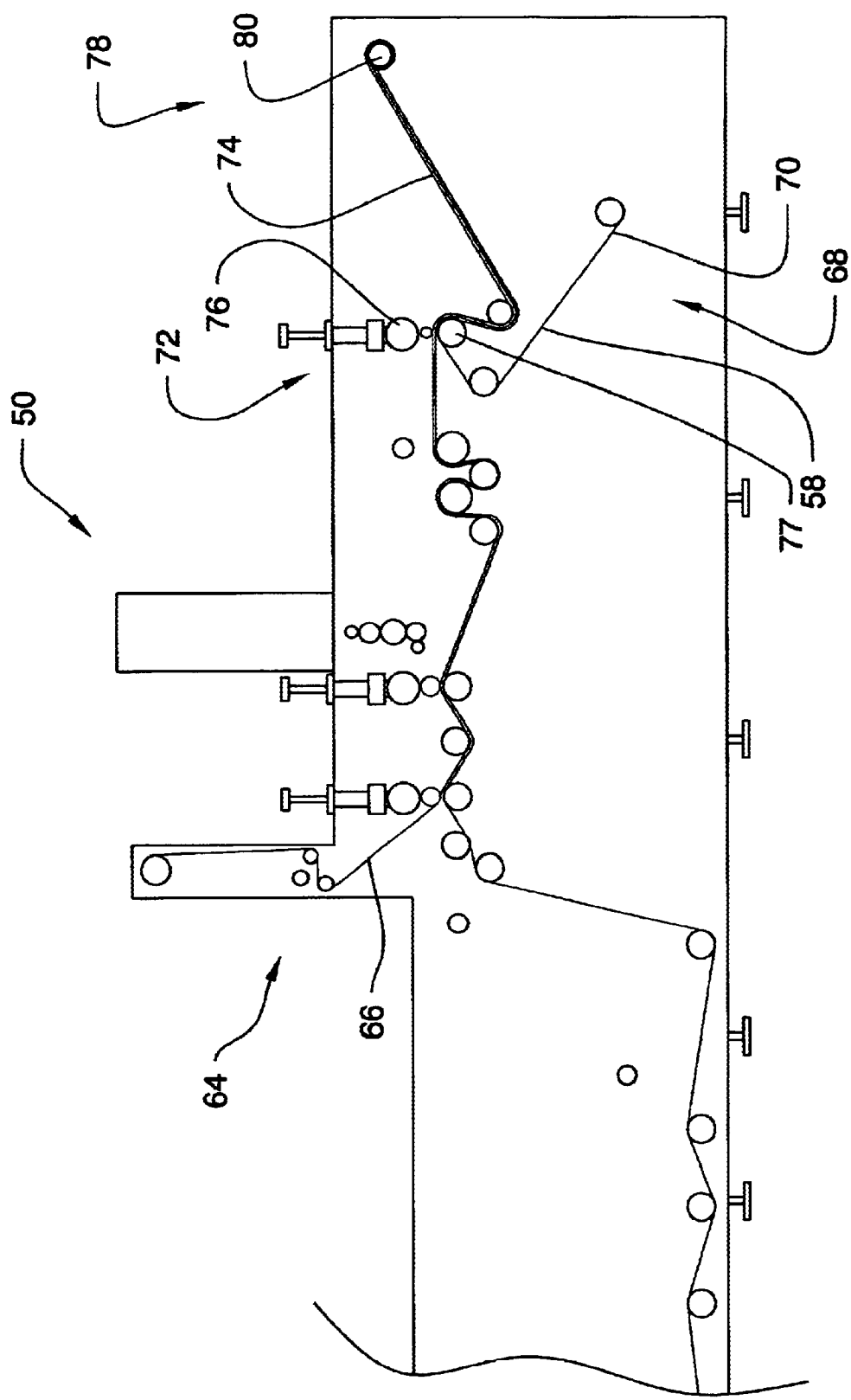
FIG. 6 is a schematic side view of a second portion of the label structure forming apparatus particularly showing a continuation of the path of the base layer and the path of the reinforcing layer including the union of the base layer and reinforcing layer of the laminated liner.

With reference now to the drawings, and in particular to FIGS. 1 through 6 thereof, a new laminated liner system 10 embodying the principles and concepts of the present invention will be described.

As best illustrated in FIGS. 1 through 4, the laminated carrier liner 12 of the invention generally comprises a base layer 14 and a reinforcing layer 16 united to form the structure of the laminated carrier liner. The laminated carrier liner 12 may form a part of the laminated carrier liner system 10 that includes a plurality of labels 18 removably adhered to the laminated carrier liner.

The structure of each of the plurality of labels 18 may take various forms, as the particular label structure is not critical to the practice of the invention. Illustratively, the label 18 may comprise an assembly of a primary panel 20, a secondary panel 22, and a laminating panel 24. Optionally, the secondary panel may comprise a folded leaflet. The primary panel 20 is provided with adhesive 26 for removably affixing the label to the laminated carrier liner, and the laminating panel 24 of the label may be provided with adhesive 28 to secure the laminating panel to the other parts of the label. The adhesive 26 on the primary panel may preferably comprise a pressure sensitive adhesive.

The laminated carrier liner 12 may be elongate with a longitudinal axis 30 extending along a length of the carrier liner, and may have lateral side edges 32, 33 extending substantially parallel to the longitudinal axis. The plurality of labels may be positioned in a line on the carrier liner along the longitudinal axis, and the plurality of labels may be oriented in a single file. The laminated carrier liner is suitably flexible, and the carrier liner generally may have a flexibility that is relatively greater than a flexibility of the labels.

In greater detail, the laminated carrier liner 12 includes the base layer 14 on which the plurality of labels may be adhered. The base layer 14 has a front face 36 and a back face 38, and has lateral side edges 40, 41 that typically form the lateral side edges of the carrier liner. The plurality of labels may be adhered to the front face of the base layer, and preferably the front face may have a relatively low-adhesion surface 42 for facilitating peeling of the adhesive of the labels from the front face without removing a substantial portion of the adhesive from the label structure. The front face of the base layer may have a silicone composition applied thereon to form the low-adhesion surface.

Preferably, the base layer 14 may be formed from a paper material of the types generally referred to as 40 pound paper and 50 pound paper, and although paper material of other weights may be used, paper materials of these weights have been found to be especially suitable for use in the laminated liner structure of the invention.

The reinforcing layer 16 of the laminated carrier liner structure of the invention is positioned adjacent to the back face 38 of the base layer 14. The reinforcing layer 16 has a front face 44 and a back face 45, and the reinforcing layer has sides 46, 47 oriented substantially parallel to the lateral side edges 40, 41 of the base layer. The front face 44 of the reinforcing layer may have an adhesive 48 thereon, and the adhesive 48 is adhered to the back face 38 of the base layer in the laminated carrier liner structure.

Preferably, the reinforcing layer 16 is formed from a plastic film, sometimes referred to as self-wound laminate. Thus, in one 30 highly preferred embodiment of the invention, the base and reinforcing layers are formed from dissimilar materials, paper and plastic. The plastic film of the reinforcing layer may suitably have a thickness of approximately 0.25 mils to four mils. In some forms the film is transparent. In one highly preferred aspect of the invention, the reinforcing layer may be formed of the same or substantially the same material as the laminating panel of the label structure, and may also have the same characteristics (such as thickness) as the laminating panel.

In one aspect of the laminated carrier liner structure of the invention, the reinforcing layer 16 is substantially coextensive with the base layer 14 and a width of the reinforcing layer (measured transversely to the longitudinal axis of the carrier liner) is substantially equal to a width of the base layer (measured transversely to the longitudinal axis of the carrier liner). In one preferred embodiment of the invention (see FIGS. 1 and 2), the width of the reinforcing layer 16 is less than the width of the base layer 14 such that the sides 46, 47 of the reinforcing layer are spaced inwardly from the lateral side edges 40, 41 of the base layer. As the relative strength of the reinforcing layer 16 is most needed in the longitudinal direction of the laminated carrier liner structure, it has been found that the width of the reinforcing layer does not have to equal the width of the base layer 14 to obtain the desired longitudinal strength for the laminated carrier liner structure, and thus a reinforcing layer having a reduced width with respect to the base layer may provide sufficient longitudinal strength to the carrier liner structure. Further, reinforcing layers of relatively reduced widths are suitable for resisting tearing of the carrier liner structure from lateral side edge to lateral side edge of the laminated carrier liner.

Optionally, a lateral distance between sides 46, 47 of the reinforcing layer 16 may be less than approximately 80 percent of a distance between the lateral side edges 40, 41 of the base layer 14. As a further option, the lateral distance between sides of the reinforcing layer may be less than approximately 60 percent of a distance between the lateral sides edges of the base layer.

The invention also contemplates a laminated carrier liner forming apparatus 50 for forming the laminated carrier liner. The apparatus may employ a base layer web 52 having a front face 54 and a back face 55, a primary panel web 56 being removably adhered to the front face 54 of the base layer web, and a reinforcing layer web 58. The apparatus 50 has a longitudinal extent along which a base layer web path 60 extends, and the base layer web path 60 may have a beginning and an end.

The apparatus 50 may include a base layer feed stage 62 for feeding the base layer web 52 onto the base layer web path 60. Optionally, the apparatus 50 may include at least one secondary panel feed stage (not shown) for feeding a secondary panel web onto a secondary panel web path of the apparatus. As further options, the apparatus may include means for printing on the primary panel and means for printing on the secondary panel web. One manner of providing such optional features is disclosed in my copending patent application entitled "LABEL STRUCTURE AND METHOD OF FORMING THE LABEL STRUCTURE".

The apparatus 50 may also include a laminating stage 64 for applying a laminating layer web 66 to a front face of the primary panel web. The laminating layer web stage 64 is preferably adapted to attach the at least one secondary panel web to the front face of the primary panel web by means of the laminating layer web and the adhesive on the laminating layer web.

The apparatus also may include a reinforcing layer feed stage 68 for feeding the reinforcing layer web 58 along a reinforcing layer web path 70 of the apparatus. The reinforcing layer feed stage 68 may be located along the base layer web path after the laminating stage 64. Optionally, the reinforcing layer feed stage may be located after the secondary panel feed stage, if such a stage is employed. The reinforcing layer feed stage 68 may be located below the base layer web path 60.

The apparatus may also include a reinforcing layer application stage 72 for applying the reinforcing layer web to the back face of the base layer web to form a composite web 74, and may be located along the reinforcing layer web path 70 after the reinforcing layer feed stage 68. The reinforcing layer application stage may apply the reinforcing layer web 58 continuously along a longitudinal extent of the base layer web 52. The reinforcing layer application stage may also apply the reinforcing layer web in a transversely centered position on the base layer web between the lateral side edges of the base layer web. Illustratively, the reinforcing layer application stage 72 may include a pair of rolls 76, 77 located adjacent to each other with the base layer web path 60 extending between the pair of rolls. A first one 76 of the rolls may be adjustably biased against a second one 77 of the rolls for pressing the reinforcing layer web against the base layer web to securely adhere the reinforcing layer to the base layer.

The apparatus 50 may also include a spooling stage 78 for spooling the composite web 74 on a spool 80. The spooling stage 78 may be located at the end of the base layer web path 60.

Optionally, each of the web paths of the apparatus 50 may be located in a common vertical plane with each other.

A method aspect of the invention generally contemplates forming the aforedescribed laminated carrier liner, using the aforedescribed apparatus or other means for performing the steps of forming the laminated carrier liner, including feeding the base layer web onto a base layer web path, feeding the reinforcing layer web along a reinforcing layer web path, and applying the reinforcing layer web to the back face of the base layer web opposite of the primary panel on the front face of the base layer web to form a composite web.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laminated carrier liner for carrying a plurality of labels each having an adhesive on a back face of the label, the carrier liner comprising:

a base layer for adhering the plurality of labels thereon, the base layer having a front face and a back face, the base layer being elongate with a longitudinal axis extending along a length of the base layer, the base layer having lateral side edges forming lateral side edges of the carrier liner;

a reinforcing layer positioned adjacent to the back face of the base layer, the reinforcing layer having a front face and a back face; and an adhesive adhering the front face of the reinforcing layer to the back face of the base layer;

wherein the reinforcing layer has sides oriented substantially parallel to the lateral side edges of the base layer, and wherein the sides of the reinforcing layer are spaced inwardly from the lateral side edges of the base layer.

2. The laminated carrier liner of claim 1 wherein the base layer comprises a paper material and the reinforcing layer comprises a plastic film layer.

3. The laminated carrier liner of claim 1 wherein the front face of the base layer has a composition applied to a surface thereof for facilitating peeling of the adhesive of the labels from the front face.

4. The laminated carrier liner of claim 1 wherein a lateral distance between sides of the reinforcing layer is less than approximately 80 percent of a distance between the lateral side edges of the base layer.

5. The laminated carrier liner of claim 1 wherein a lateral distance between sides of the reinforcing layer is less than approximately 60 percent of a distance between the lateral sides edges of the base layer.

6. The laminated carrier liner of claim 1 wherein the reinforcing layer reinforces the base layer against tearing of the base layer.

7. The laminated carrier liner of claim 6 wherein the reinforcing layer reinforces the base layer in a longitudinal direction of the base layer.

8. The laminated carrier liner of claim 1 wherein the reinforcing layer is a plastic film.

9. The laminated carrier liner of claim 1 wherein the reinforcing layer has a thickness of approximately 0.25 mils to approximately 4 mils.

10. A laminated carrier liner system comprising:

a plurality of labels each having an adhesive on a back face of the label, the adhesive comprising a pressure sensitive adhesive; and a laminated carrier liner for carrying the plurality of labels, the laminated carrier liner having a longitudinal axis extending along a length of the carrier liner, the laminated carrier liner having lateral side edges, the plurality of labels being positioned in a line along the longitudinal axis, the plurality of labels being oriented in a single file, the laminated carrier liner being flexible, the carrier liner having a flexibility relatively greater than a flexibility of the labels, the laminated carrier liner comprising:

a base layer on which the plurality of labels are adhered, the base layer having a front face and a back face, the base layer having lateral side edges forming the lateral side edges of the carrier liner, the plurality of the labels being adhered to the front face of the base layer, the front face having a silicone composition applied to a surface thereof for facilitating peeling of the adhesive of the labels from the front face, the base layer comprising a paper material;

a reinforcing layer positioned adjacent to the back face of the base layer, the reinforcing layer having a front face and a back face, the reinforcing layer comprising a plastic film, the reinforcing layer having sides oriented substantially parallel to the lateral side edges of the base layer with the sides of the reinforcing layer being spaced inwardly from the lateral side edges of the base layer; and an adhesive being positioned between the front face of the reinforcing layer and the back face of the base layer, the adhesive comprising a layer of adhesive between the reinforcing layer and the base layer.

* * * * *